Oct. 17, 1967  K. R. KESKA ETAL  3,347,078
TUBE RESHAPING MACHINE

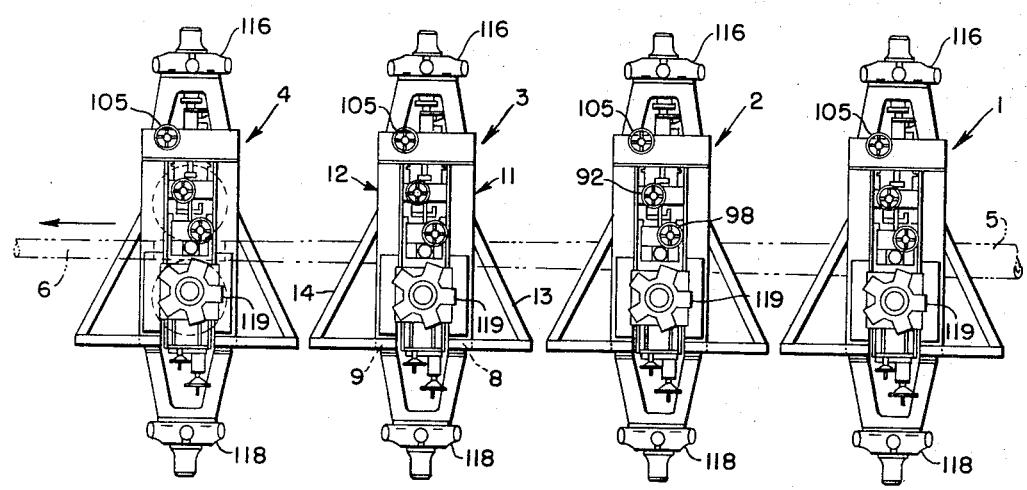
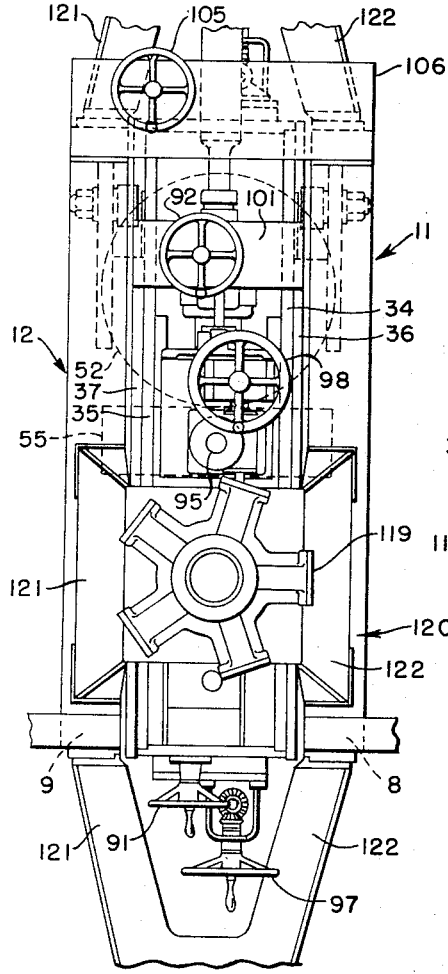
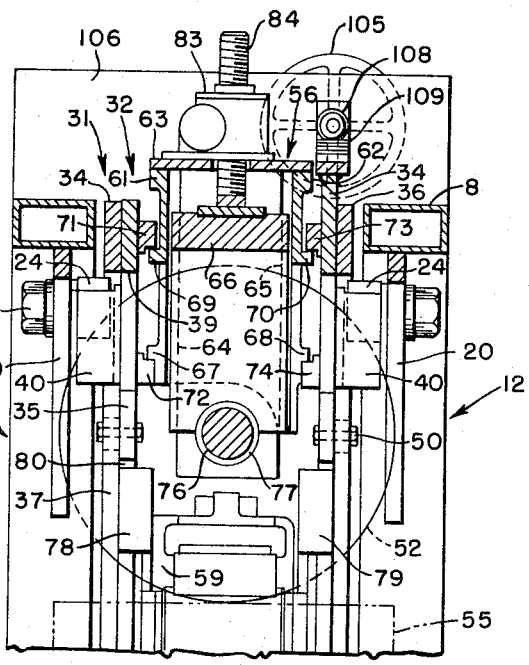

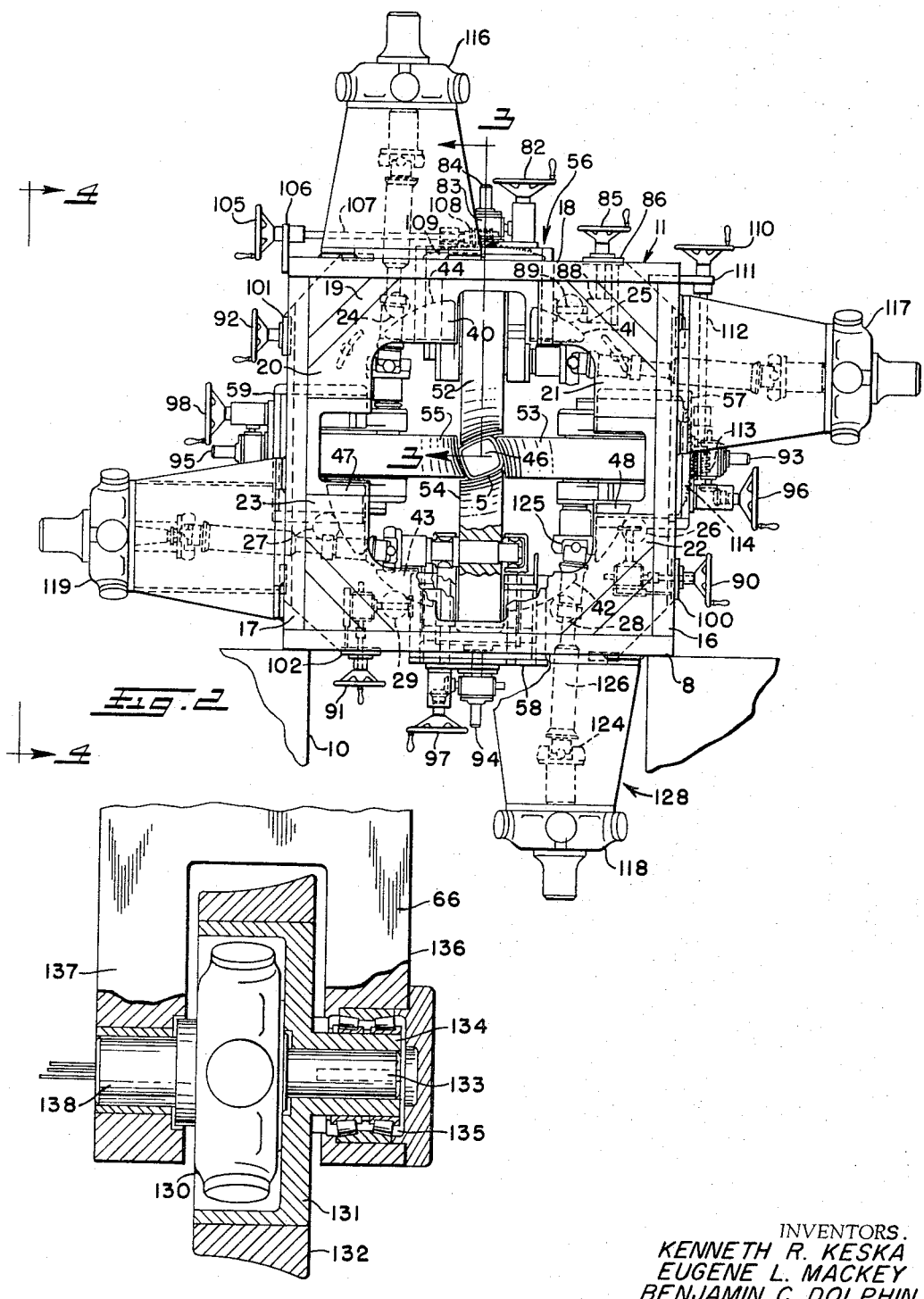

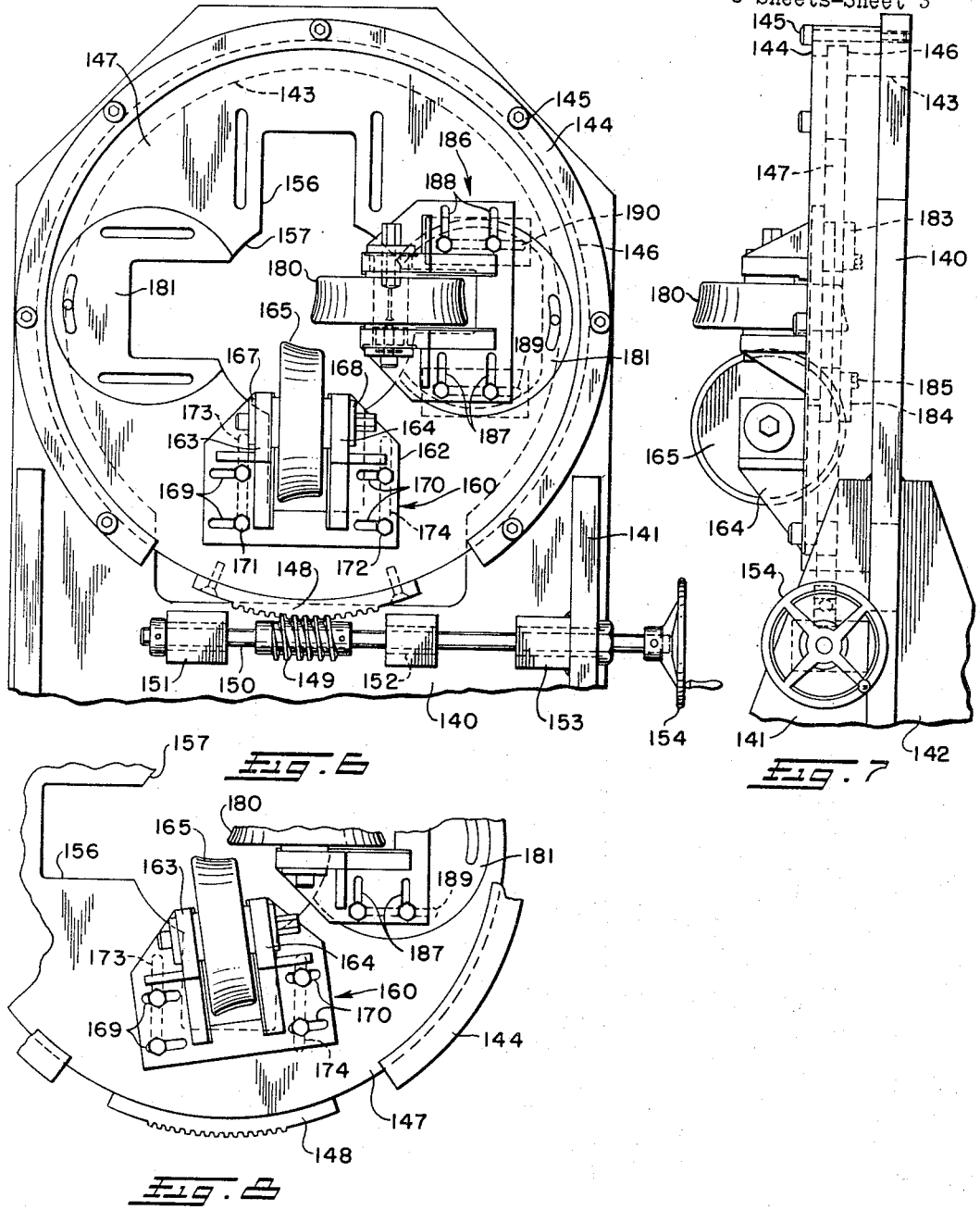

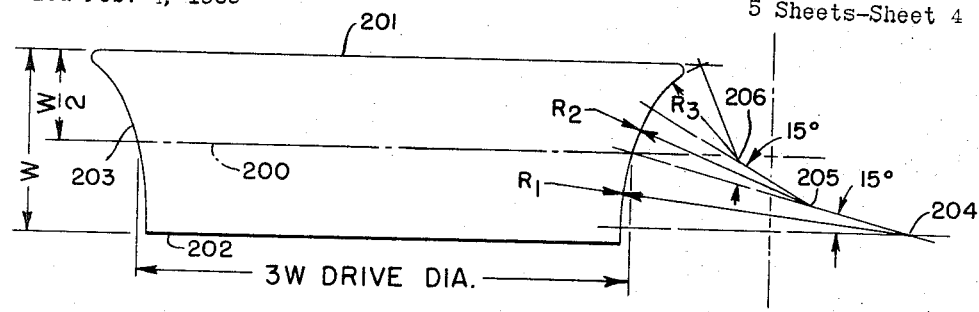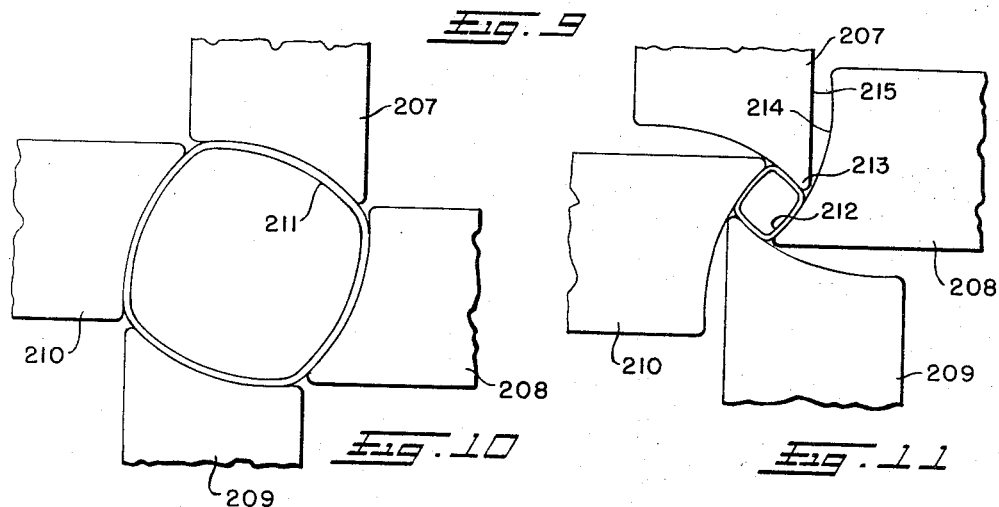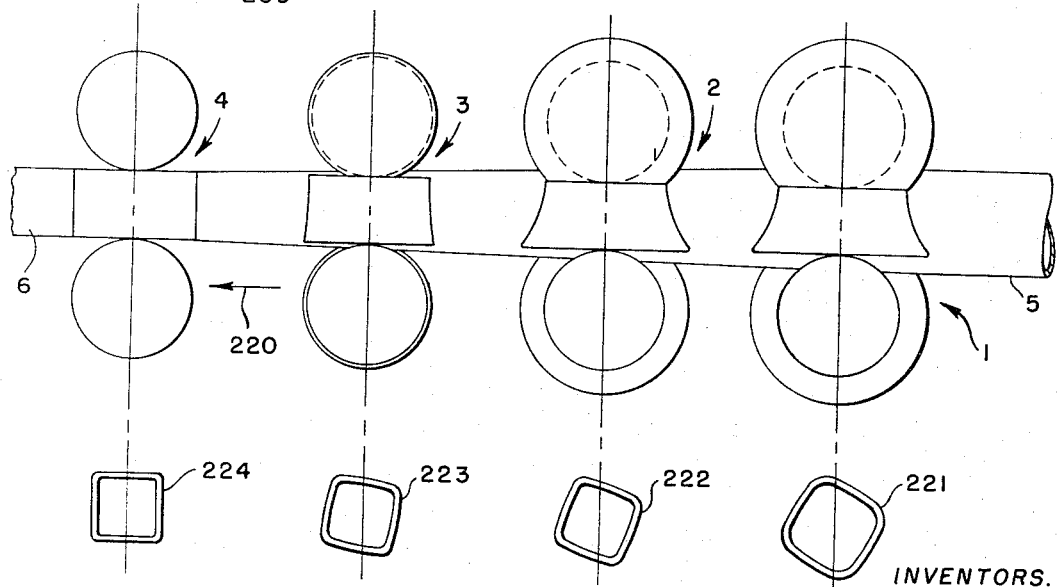

Filed Feb. 4, 1965  5 Sheets-Sheet 5

INVENTORS
KENNETH R. KESKA
EUGENE L. MACKEY
BENJAMIN C. DOLPHIN

BY

*Oberlin, Maky & Donnelly*
ATTORNEYS

United States Patent Office 3,347,078
Patented Oct. 17, 1967

3,347,078
TUBE RESHAPING MACHINE
Kenneth R. Keska, Bay Village, Eugene L. Mackey, Fairview Park, and Benjamin C. Dolphin, Bay Village, Ohio, assignors to The Yoder Company, Cleveland, Ohio, a corporation of Ohio
Filed Feb. 4, 1965, Ser. No. 430,281
30 Claims. (Cl. 72—225)

ABSTRACT OF THE DISCLOSURE

A four pass tube reshaping machine wherein the initial passes each comprise a plurality of rolls forming a pass cluster with each roll having a concave curved work face profile, the center of curvature of which is laterally offset to permit the rolls to be nested together to form passes of different size and shape without changing the roll tooling, three adjustments for each roll in its respective pass including angular adjustment, and hydraulic motor drive means for each roll.

---

This invention relates generally as indicated to a tube reshaping machine and more particularly to a tube shaping mill adapted to reform round tubing or pipe into square, rectangular or other sectional shapes.

A device known as a double turk's head may be employed to convert tubing from a round to some other sectional shape. Such tube reshaping devices may be employed when one or more different shapes of tubing are to be formed from the flat stock of the same width. Instead of using a complete set of main forming rollers for each of the desired shapes, the initial tooling investment may be substantially reduced by using one set of rolls for producing the round tubing and then the tube reshaping machine for converting the round tubing into the desired sectional shape. However, one set of reshaping rolls for each of the different shapes to be reformed from the same round tubing is required and accordingly, the reshaping tooling must be changed not only when a shape is to be produced from a different diameter round, but also when different shapes are to be produced from the same round tube or pipe.

Accordingly, because of the high cost of tooling, and the down-time required for tooling changes, it is desirable to have a tube reshaping machine which can make a wide range in both configuration and size of tubing by reshaping round stock simply by adjustment of the rolls rather than change of tooling.

It is accordingly a principal object of the present invention to provide a tube reshaping machine which can produce square, rectangular or other shape tubing from round stock with only one set of rolls.

Another principal object of the present invention is the provision of a tube reshaping machine which can make a variety of sizes of square, rectangular or other shape tubing from round stock with only one set of rolls.

Another object is the provision of a tube reshaping machine wherein change of size or shape of the produced work requires only adjustment of the machine and not changes of tooling.

A further object is the provision of a forming roll assembly wherein each of the rolls is provided with curved faces, the centers of which are eccentrically disposed with respect to the roll center plane in order to obtain symmetry of an enclosed pass regardless of the position of adjustment and size of the work being formed.

Still another object is the provision of a tube reshaping machine utilizing compound radius rolls in at least the initial pass having surface portions optimally suited for the formation of square or rectangular shapes.

Yet another object is the provision of a tube reshaping machine having a variety of roll adjustments including the ability to twist or pivot each roll cluster forming adjacent passes about the axis of the work.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

In said annexed drawings:

FIG. 1 is a side elevation of one form of tube reshaping machine in accordance with the present invention;

FIG. 2 is an enlarged end elevation partially broken away and in section of one of the roll stands of the FIG. 1 machine;

FIG. 3 is an enlarged fragmentary vertical section of such stand taken substantially on the line 3—3 of FIG. 2;

FIG. 4 is a fragmentary end elevation of the roll stand of FIG. 2 taken substantially on the line 4—4 thereof;

FIG. 5 is an enlarged fragmentary sectional view of an alternative form of roll drive;

FIG. 6 is a view similar to FIG. 2 of another form of roll stand for the present invention;

FIG. 7 is a fragmentary end elevation of the roll stand of FIG. 6 as seen from the right thereof;

FIG. 8 is a fragmentary end elevation illustrating an adjustment feature for the rolls of the FIG. 6 embodiment;

FIG. 9 is a profile view of one of the rolls for the No. 1 reshape pass illustrating some of the established parameters;

FIG. 10 is a schematic illustration of the configuration of the No. 1 reshaping pass adjusted for the reshaping of a large size square sectional shape;

FIG. 11 is a schematic illustration of the configuration of the same pass with the rolls adjusted for the reshaping of a tube into a square sectional shape of much smaller size;

FIG. 12 is a schematic illustration of a four pass reshaping mill including sectional views of the work in each pass and their relation to each other;

Figure 13:
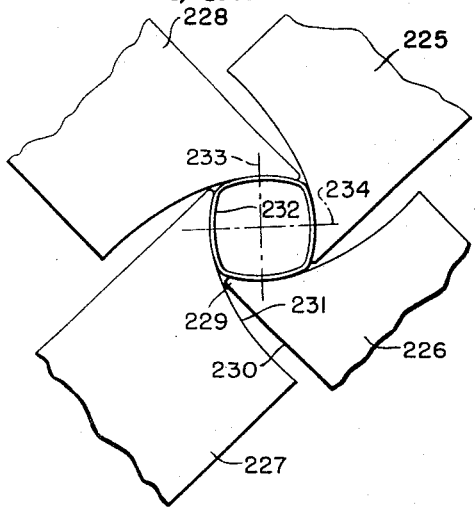
FIG. 13 is a view similar to FIGS. 10 and 11 illustrating the rolls of the No. 1 reshaping pass positioned to reshape tubing into a square sectional shape.

Referring now to the annexed drawings and more particularly to FIGS. 1 through 4, and first to FIG. 1, there is illustrated a tube reshaping machine which may comprise four roll stands 1, 2, 3 and 4 forming the initial or first pass, the second, third, and fourth or finishing pass of the machine or mill. The work 5 shown in phantom lines may enter the mill or machine from the right as seen in FIG. 1 directly from a tube or pipe mill and as it progresses through the mill will be changed in sectional shape from the initial round shape to a square or rectangular shape at the exit as shown at 6.

Each of the pass forming stands may be substantially identical in form and each includes base frame members 8 and 9 which extend transversely of the path of the work 5 and which may bridge a pit 10. The base frame members 8 and 9 are laterally spaced from each other along the axis of the work and form the bottom frame members of square exterior frames shown generally at 11 and 12. Angularly directed braces 13 and 14 may be employed to rigidify such frames 11 and 12. The frames may be fabricated from rectangular tubing as indicated in FIG. 3 and each includes a vertical member 16 and 17 and a horizontal top member 18. Gusset braces 19 may be employed at the corners of the structural frames for rigidification purposes. In addition, each of the structural frames 11 and 12 is provided with corner plates indicated at 20, 21, 22 and 23 which support inwadrly directed rollers 24, 25, 26, 27, 28 and 29. Each of the plates 20 through 23 are of the profile configuration more clearly seen in FIG. 2 where is shown four such corner plates for each of the structural frames 11 and 12, or eight altogether. Also shown are six inwardly directed rollers projecting from the plates of each of the frames 11 and 12 or twelve altogether. Of course, more or less such plates and rollers may be employed. Such rollers may be journalled on suitable axles secured to the plates by the fasteners indicated at 30 as seen more clearly in FIG. 3.

Situated between the main structural frames 11 and 12 are two relatively movable tooling frames 31 and 32 which are comprised of parallel plates. The frame 32 is comprised of the inner parallel plates 34 and 35 while the frame 31 is comprised of the outer parallel plates 36 and 37. The paired plates 34 and 35, and 36 and 37 may be interconnected by bridging plates to tie the same together as integral frames to comprise the inner and outer frames 32 and 31. The plates 34 through 37 may be annular providing a central opening therethrough and include slots as indicated at 39 in FIG. 3 accommodating the rolls or tooling of the stand of the machine. The various plates may be provided with suitable windows to avoid interference with each other in the performance of their functions hereinafter set forth.

Outwardly projecting blocks 40, 41, 42 and 43 are mounted on the outer frame 31 and are provided with circular exterior surfaces as indicated at 44 in FIG. 2, all of which may be struck substantially from the same center. These block surfaces may constitute rails which ride on the respective rollers 24, 25, 28 and 29, confining the frames 31 and 32 for controlled movement about the axis 46 of the work path. The plates of the inner frame 32 may be provided with outwardly projecting blocks indicated at 47 and 48 in FIG. 2. These blocks, which may project through suitable windows in the outer plates 36 and 37, have exterior circular surfaces which may be struck from the same center as the surfaces 44 and are in engagement with the rollers 26 and 27. The frames 31 and 32 may normally be secured together for integrated adjustment about the axis 46 by the fasteners 49 and 50 seen in FIG. 3 which may project through arcuate slots in the outer plates 36 and 37. Such fasteners may comprise conventional clamping bolts.

The integrated frame 31, 32 supports the four rolls or tooling of the illustrated stand shown at 52, 53, 54 and 55. The inner frame comprised of the plates 34 and 35 may support the top and bottom rolls 52 and 54, while the outer frame comprised of the plates 36 and 37 may support the rolls 53 and 55. The mounting of the rolls on the respective frames is by means of respective roll housings 56, 57, 58 and 59.

The construction of the roll housings is perhaps best seen in FIG. 3 and each includes U-shape side frame members 61 and 62, the legs of which will straddle the roll carried thereby. The outer end of the housing is bridged by a frame plate 63. The inner edges of each roll housing are provided with guides seen at 64 and 65 in FIG. 3 confining a U-shape yoke 66 for movement therealong in a direction generally toward and away from the axis 46 of the work. Each leg of each housing on both sides is provided with a rail as seen at 67 and 68 in FIG. 3 and the bight portion of the roll housing on both sides is also provided with a rail as seen at 69 and 70. The rails 67 and 69 fit closely inside of rails 71 and 72 which are mounted on the plate 35. It will be appreciated that there are two rails 72, one on each side of the slot 39 just as there are two rails 67, one for each leg of the roll housing. Similarly, the rails 70 and 68 fit closely inside rails 73 and 74 mounted on the plate 34, there being two rails 74 just as there are two rails 72.

The roll 52 is mounted on an axle 76. The axle is journalled in the legs of the yoke 66 by suitable roller bearings 77 and it can now be seen that adjustment of the yoke 66 along the guides 64 and 65 will move the roll 52 toward and away from the axis 46 of the work. Adjustment of the roll housing 56 along the rails 71, 73, 72 and 74 will then move the roll 52 parallel to the axis of its axle 76 or transversely of the axis 46 of the work path.

The roll housings 57 and 59 for the rolls 53 and 55, respectively, may be identical in form but the rails therefor indicated at 78 and 79 in FIG. 3 are mounted on the outer plates 37 and 36 forming the frame 31. Such rails may extend through windows indicated at 80 in the inner plates permitting the plates to be moved relative to each other as will hereinafter be described. As seen in such figure, the roll 55 will be mounted on the legs 82 of the yoke which is adjustably mounted in the roll housing 59.

It will thus be seen that each of the rolls is mounted in a yoke which may be adjusted in its respective roll housing for movement toward and away from the axis of the work path and, moreover, the roll housing may be adjusted transversely along the axis of the roll. Referring now to FIG. 2, it will be seen that adjustment of the roll 52 toward and away from the axis 46 may be obtained by hand wheel 82 which drives a transmission 83 to move axially jack screw 84 which extends through an aperture in the roll housing plate 63 and is connected to the bight portion of the yoke 66 as seen in FIG. 3. It is now believed apparent that rotation of the hand wheel 82 will then cause the jack screw 84 to move the yoke 66 along the guides 64 and 65 to move the roll 52 toward and away from the axis of the work 46.

A similar hand wheel 85 which is mounted on bridge plate 86 extending between the plates 35 and 34 is employed to move the roll housing 56 horizontally with respect to the frame 32 as seen in FIG. 2. This movement of the roll housing moves the roll 52 along its own axis or transversely of the axis 46 of the work. The hand wheel is effective through right angle drive 87 mounted on bridge plate 86 to turn jack screw 89 connected to the side of the housing 56. The roll housings 57, 58 and 59 may be adjusted transversely or parallel to the axle of the rolls 53, 54 and 55, respectively, by similar right angle driven jack screws controlled by hand wheels 90, 91 and 92, respectively. The yokes within the housings 57, 58 and 59 may also be moved toward and away from the axis 46 of the work by jack screws 93, 94 and 95 controlled by hand wheels 96, 97 and 98, respectively. The hand wheels 90 and 92 are mounted on bridge plates 100 and 101 which may be connected to the plates 37 and 36 straddling the plates 35 and 34. The hand wheel 91 is mounted on bridge plate 102 which may be connected simply to the inside plates 35 and 34. It can now be seen that each of the rolls in the cluster forming the tooling can be moved both axially of itself as well as in and out with respect to the axis 46 of the work.

The entire tooling supporting frame which includes the frames 31 and 32 may be rotated about the axis 46 of the work by hand wheel 105 which is mounted on upstanding bracket plate 106 which extends between the main supporting structural frames 11 and 12. The hand wheel 105 drives shaft 107 to rotate worm 108 in mesh with gear segment 109 having as its center, the axis 46 of the work. The gear segment 109 may be mounted on an extension of plate 34 as shown in FIG. 3 and it can be seen that as the hand wheel 105 is turned, with the frame assembly 31, 32 clamped, the entire frame assembly 31, 32 will be rotated about the axis 46 of the work. The gear segment 109 may, of course, be mounted on either plate 34 or 36. The hand wheel will then shift the arcuate rails 40, 41, 48, 42, 43 and 47, respectively, on the rollers 24, 25, 22, 28, 29 and 27. In this manner, an adjustment for twist is provided and the entire roll cluster may be shifted bodily about the center 46 to either side.

As hereinafter described, in the formation of rectangular shapes, it may be desired to shift the opposite rolls 53 and 55 with respect to the rolls 54 and 52 and this may be accomplished by hand wheel 110 mounted on bracket plate 111 driving shaft 112 having worm 113 mounted thereon. The bracket plate 111 extends between the two inner plates 34 and 35. The worm 113 is in mesh with a gear segment 114 which may be mounted on an extension of the outer plate 36 and thus the outer frame 31. Now in order to shift the center plane of the rolls 53 and 55 with respect to the center plane of the rolls 52 and 54, the clamping bolts 49 and 50 may be loosened and the hand wheel 110 then employed to rotate the inner frame 32 with respect to the outer frame 31. The hand wheel operated mechanism in effect acts as a screw jack reacting against both frames.

In the illustrated embodiment, each of the rolls may be provided with its own drive and such drive may comprise radial piston type hydraulic motors 116, 117, 118 and 119 for the rolls 55, 52, 53 and 54, respectively. Each of the motors is supported on a stand as shown at 120 which includes legs 121 and 122 mounted on the main structural frames 11 and 12 and straddling the frames 31 and 32. The drive connections may be the same for each of the rolls and comprises universal couplings 124 and 125 interconnected by an extensible shaft 126.

Referring now to FIG. 5, when roll sizes permit, a more compact drive may be achieved by mounting the hydraulic motor 130 inside rim 131 and the roll working portion 132 may be secured thereto much as a tire is mounted on a wheel. The drive shaft 133 of the motor 130 is keyed to the hub 134 of the rim 131. The hub 134 is journalled as indicated at 135 in the leg 136 of the yoke 66 and the opposite leg 137 is mounted on the extension 138 of the housing of the motor. In this manner, the universal couplings and drive shafts may be dispensed with and it will be appreciated that a much more compact roll stand is provided than that shown in FIG. 2.

In the illustrated embodiment, radial piston type hydraulic motors are employed but it will be appreciated that other types of hydraulic motors may equally well be employed and, of course, more conventional DC electric motor drives may be employed to drive the tooling in each stand. In any event, adjustable speed drives are provided for each roll and the resulting roll surface speeds in any one pass will normally be equal. However, in succeeding passes, this speed may be slightly higher so that each pass is composed of four synchronized rolls, the speeds of which in any one pass being controlled or separately adjustable to produce the desired tension between passes. As the average line speed is increased, the overall drive may be such that this relationship is maintained.

Referring now to the embodiment illustrated in FIGS. 6, 7 and 8, and first to FIGS. 6 and 7, the illustrated roll stand may comprise an upstanding plate 140 having laterally extending braces 141 and 142 secured thereto at each side to support the plate in an upstanding position transversely of the axis of the work. The plate 140 at its upper end is provided with an aperture 143 around which is secured a ring 144 by suitable fasteners 145. The ring 144 is provided with a circular channel 146 in which fits the outer periphery of circular plate 147. A circular rack or gear segment 148 is secured to the edge of the plate 147 and such is in mesh with worm 149 mounted on shaft 150. The shaft 150 may be journalled at 151 and 152 on the plate 140 and at 153 on the brace 141 and rotated by hand wheel 154. It can now be seen that the hand wheel is effective to cause the plate 147 to rotate about its center in the channel 146 provided by the ring 144.

The plate 147 is provided with four quadrant spaced slots 156 extending radially from a center opening 157 accommodating the respective rolls in a cluster surrounding the work which passes transversely of the plate 147 through the center thereof. It will be understood that the tooling or rolls forming the cluster for each pass may be four in number and such rolls are mounted on roll brackets 160 which comprise U-shape plates 162 having stanchion plates 163 and 164 adjacent each leg of the U. The axle of the roll 165 may be journalled in such stanchion plates as indicated at 167 and 168. The plate 162 is provided with paired parallel laterally spaced slots 169 and 170 on each leg of the U and clamping bolts 171 and 172 extend through each pair of slots into slots 173 and 174, respectively, in the plate 147 adjacent the slot or cut-out 156. Such latter slot extends normal to the slots 169 and 170 in the roll bracket plate 162 as seen in FIG. 6. It can now be seen that by loosening the clamping bolts 171 and 172, the bracket 160 can be shifted laterally as seen in FIG. 6 parallel to the axis of the roll by utilizing the slots 169 and 170 or toward and away from the axis of the work or in an in-and-out direction by utilizing the slots 173 and 174. The roll 165 and the one diametrically opposed thereto or at the top of FIG. 6 may be mounted in the same manner.

The roll 180 as well as its diametrically opposed roll may be mounted on a swivel plate 181 which is recessed in the plate 147 and held in a rotatably adjusted position by keeper plates 183 and 184 secured to the swivel plate by clamping fasteners 185. The roll 180 is journalled in the stanchion plates of roll bracket 186 which may be identical in form to the roll bracket 160. Pairs of parallel laterally spaced slots 187 and 188 in the bracket plate cooperate with slots 189 and 190 in the swivel plate adjustably to support the roll bracket on the swivel plate for both lateral or axial movement of the roll 180 as well as in-and-out movement. Additionally, the swivel plate 181 may be rotated about its center thus to adjust the roll in its angular attack on the work.

It will be appreciated, as seen in FIG. 8, that the double slot connection between the roll bracket 160 and the plate 147 also permits the roll bracket to be tilted or canted with respect to its radial approach to the work. This can be done manually by manipulation of the clamping bolts 171 and 172 and markings or outlines on the plate 147 can be used by the operator to facilitate the positioning of the roll brackets. It will, of course, be appreciated that a more precise adjustment may be obtained with the swivel plate 181 and the adjustment of such swivel plate as well as the axial and in-and-out movements may be obtained by suitable jack screws and micrometer dials may also be employed to increase the degree precision involved.

It can now be seen that in the FIG. 6 embodiment, the four rolls may be rotated about the work axis as an adjustment for twist by the operation of the hand wheel 154. The rolls may also be each adjusted in-and-out or toward and away from the work to accommodate different size workpieces by movement of the brackets as permitted by the slots 173, 174, or 189, 190. Cross adjustment is afforded each roll as permitted by the pairs of slots 169, 170 or 187, 188 so that the rolls may each be moved axially and additionally, angular adjustment may be afforded by the swivel plates 181 or by the adjustment of the roll 165 illustrated in FIG. 8. In this manner, the radial center plane of the roll may be directed toward the work at an angle to a radius from the center of the work.

In the FIGS. 6 and 8 embodiment, the angular adjustment of the roll is provided individually for each roll whereas in the FIG. 2 embodiment, the hand wheel 110 changes the angular adjustment of two diametrically opposed rolls simultaneously and only with respect to adjacent rolls. This angular adjustment is to be utilized in the initial forming pass or pass No. 1 for the formation of the initial pass for rectangular shapes. Such adjustment features may, however, be omitted on the succeeding passes.

FIGS. 1 through 8 illustrate several embodiments of roll stands in which the tooling of the present invention may be employed to reshape round elongated objects into rectangular, square, or other shapes. In any event, the feature common to the illustrated embodiments is that one set of rolls or tooling can be utilized to reshape a range of sizes of round tubing into a corresponding range of square, rectangular, or other shape tubing. The basic design thus consists of a cluster of four rolls each of which may be driven and adjusted into position or angle of attack as indicated.

It will be appreciated that the rolls of the FIG. 6 embodiment may be driven by flexible drives or in the manner shown in FIG. 5. The common feature of the tooling for the machine at least through the first three passes is that the roll faces are provided with lopsided or eccentric curved faces to enable the same to form a cluster and a symmetrical work pass therethrough to reshape a wide range of size as well as square, rectangular, or other shapes.

The initial pass will, however, be provided with compound radius rolls such as illustrated in more detail in FIG. 9. A determination of the roll profile for the No. 1 reshape pass may be based upon a reshape range of: $W/w$ or about 3/1 which is the mill range, wherein W equals the width of the largest square to be shaped and $w$ equals the width of approximately the smallest square to be shaped. The round tube corresponding to the largest square to be formed may have a diameter $D_L$ which is about equal to $W \times W$ square. The circumference $C_L$ of the largest round tube is, of course, equal to $\pi D_L$ or approximately $4 \times W$ and $D_L$ is, of course, about equal to $4W/\pi$. The smallest round tube to make a $w \times w$ square will have a diameter of about $D_s$ and the same relations hold true, i.e. $C_s$ equals about $\pi D_s$, $C_s$ equal approximately $4 \times w$, and $D_s$ equal about $4w/\pi$.

Again, with reference to FIG. 9, it will be seen that the width of the roll for the initial pass may be equal to W or the wall width of the largest square to be shaped. The center transaxial plane 200 of the roll is, of course, spaced from the opposite faces 201 and 202 of the roll a distance equal to W/2. The roll drive diameter measured along the transaxial center plane 200 may be 3W and the contoured face 203 of the roll may have a profile comprised of three distinct radii. The initial radius or $R_1$ may be ascertained by multiplying the factor 1.25 times the diameter of the largest round tube to make the $W \times W$ square or $D_L$.

The center 204 for $R_1$ may be arrived at by striking an angle of 15° from the point of intersection of the transaxial center plane 200 and the curved face 203. $R_3$ may be arrived at by multiplying the factor 1.25 times the diameter of the smallest round tube to make the $w \times w$ square or $D_S$. $R_2$ or the middle radius may be arrived at by subtracting $R_3$ from $R_1$.

The center 205 of $R_2$ may be obtained by striking such radius along the same 15° angle such that 204 and 205 are on the same line. The center 206 of $R_3$ may be found since the angular sweep for $R_1$ and $R_2$ will be 15° as indicated. Thus there are established parameters of the roll width, roll drive diameter, and the roll contour radii, which are ascertained by the maximum and minimum sizes of the work to be formed.

Referring now to the schematic illustration of FIG. 12, it will be appreciated that the roll profile of FIG. 9 is for the initial pass No. 1 only. The rolls or tooling of passes 2 and 3 will have progressively decreasing off-set or lopsided curvature of the faces and finally the fourth pass will have rolls which may be flat or just slightly convex. Each of the rolls for the second, third and fourth passes will, however, be of the same width and the curvature for the tooling of the second and third passes may comprise but a single radius for each with that for the third being larger than that for the second. The second pass may have a radius of tooling curvature which is 1.5 times the radius $R_1$ seen in FIG. 9 and such radius may be centered on a line struck 10° from the intersection of the transaxial center plane of the roll and the curved face thereof. The tooling for pass 3 may have a radius equal to $2 \times R_1$ and the center thereof may be on a line struck 5° from the intersection of the transaxial center plane of the rolls and the curved face of each.

Referring now to FIGS. 10 and 11 and first to FIG. 10, there is illustrated the configuration of the No. 1 reshaping pass for the largest square shape with the illustrated tooling. As will be seen, the pass is comprised of rolls 207, 208, 209 and 210, all of which may be identical in form. By positioning the rolls or tooling 207 through 210 in the position shown in FIG. 10, a workpiece 211 of the largest size which can be accommodated by the machine can be fed through the enclosed pass formed by the rolls to start the flattening thereof. When it is desired to utilize the machine to form a workpiece of much smaller size, the rolls 207 through 210 may be adjusted in position by the mechanisms shown more clearly in FIG. 2 providing both in-and-out and axial or cross-adjustment of each roll, so that the rolls form a much smaller enclosed pass of the same configuration for the smaller workpiece 212 shown in FIG. 11. The rolls of the subsequent passes can similarly be adjusted to form smaller enclosed passes of the same configuration.

It can now be seen that the laterally off-set or lopsided curved work faces of the rolls or tooling permit the sharper edges or sides of each roll shown at 213 having the greatest roll diameter to be nested into the curved working face of an adjacent roll. In this manner, the curved working face 214 of the roll 208 overlaps the side 215 of the roll 207 with the edge 213 being nested into the curve face 214. There is thereby formed a pass for the smaller work 212 of substantially the same symmetry and configuration as for the larger work 211, but utilizing only a portion of the curved work faces of each roll. It will be appreciated that the in-and-out adjustments 82, 96, 97 and 98 as well as the cross-adjustments 85, 90, 91 and 92 are all that need be employed to obtain the shift in position of the tooling from the FIG. 10 position to that of the FIG. 11 position.

Referring now to the FIG. 12 schematic illustration, it will be seen that the round tube or pipe 5 entering the initial reshaping pass 1 will be moving in the direction of the arrow 220 through the passes 2, 3 and 4, the rolls of which will have progressively increasing radii, the curvature of the fourth pass being negligible or close to infinity. As can be seen in comparing the various sectional views of the work in the passes 1, 2, 3 and 4 as seen at 221, 222, 223 and 224, a twist or spiral is being formed in the tube or work which results from the curved roll surfaces. The adjustment 154 in the FIG. 6 embodiment or the adjustment 105 in the FIG. 2 embodiment, which rotates the entire roll cluster about the axis of the work, will be effective to remove this twist or spiral shown schematically. The tube or work will, of course, be twisted against the adjacent pass and for a particular size of tube the adjustment can be made once and then locked in place. It is here noted that there will be a slight reduction in the perimeter of the work as it is reshaped from the round to the square, rectangular or other shape which results from metal that is used up in setting the corners of the reshaped tubular workpiece. The roll settings for the four reshaping passes will take this into account and distribute the reduction evenly for each of the reshaping stands. If a shape to be formed requires a tighter or smaller corner radius, it will then be appreciated that a starting round tube of somewhat greater diameter would be required.

Figure 14:
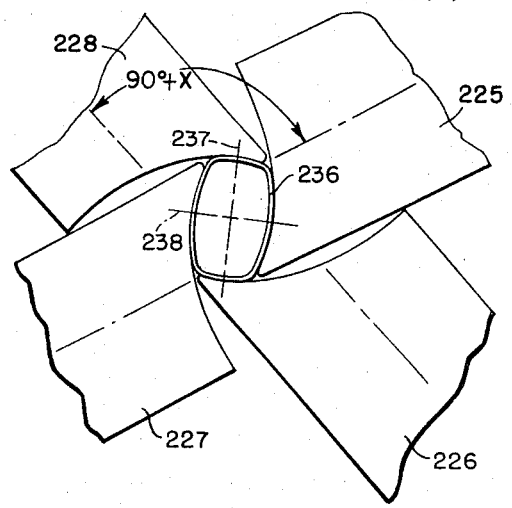
FIG. 14 is a similar view of the same pass with the same rolls adjusted to form tubing of rectangular shape.

Referring now to FIGS. 13 and 14, there is illustrated comparatively the phase relationship of the four roll cluster for the start of a square tube through pass No. 1 and the start of a rectangular tube through pass No. 1, respectively. In FIG. 13, the rolls 225, 226, 227 and 228 are all identical in form and are positioned by the adjusting means previously indicated so that the edge 229 and side 230 of one roll 226 is nested into the curved lopsided or eccentric face 231 of an adjacent roll in the symmetrical arrangement indicated to form a pass opening for a square workpiece 232 of a given size. It is noted that each side of the partially shaped work 232 engages a portion of the curved work face 231 of each of the rolls to the same extent and the lines 233 and 234 bisecting the thus curved faces of the work extend at an angle to the transaxial center planes of each roll In FIG. 13, such center planes extend normal to each other.

However, should the reshaped tube be a rectangular shape as indicated at 236 in FIG. 14, it may then be necessary to swivel one pair of opposite rolls, i.e. 227 and 225, an increment of X° as illustrated. It will be understood that the swiveling of the one pair of opposite rolls for the rectangular shape need take place in the first reshaping pass only due to the plurality of radii in each roll of the four roll cluster in that pass. The curved work faces of the rolls 227 and 225 now contact the same and a somewhat larger portion of the work while the curved work faces of the rolls 226 and 228 contact the same and a somewhat smaller portion of the work. The lines 237 and 238 bisecting the initially curved portions of the rectangular work still extend at an angle to the transaxial center planes of the rolls. The swiveling of the opposite pair of rolls as indicated in FIG. 14 may be obtained by the control 110 indicated in FIG. 2 which rotates the frame supporting the rolls 53 and 55 with respect to the frame supporting the rolls 52 and 54. In the FIG. 6 embodiment, the swivel plates 181 may be employed to obtain such increment or the opposite rolls may be positioned in the skew manner indicated in FIG. 8. In any event, the in-and-out and cross-adjustments of the rolls will also be required to be employed properly to position the rolls to form the rectangular pass illustrated.

It will now be seen that the roll stands for the four or more passes may be substantially the same but need not be provided with either identical tooling or with exactly the same adjustments. The following chart for the four reshape passes illustrated in FIG. 1 perhaps indicates more clearly the differences in the various stands.

| Reshape Pass No. | No. Rolls per Pass | Roll Adjustments | | | | No. Radii per Roll |
|---|---|---|---|---|---|---|
| | | In and Out | Cross | 2-Roll Swivel | Twist All 4 | |
| 1 | 4 | 4 | 4 | 2 | Yes | 3 |
| 2 | 4 | 4 | 4 | None | Yes | 1 |
| 3 | 4 | 4 | 4 | None | Yes | 1 |
| 4 | 4 | 4 | 4 | None | Yes | *1 |

*The last pass could be either flat or slightly convex.

It is now believed apparent that there is provided a tube reshaping machine which can utilize one set of tooling for the shaping of a variety of sizes of round tubing into a plurality of shapes. In this manner, complete tooling changes are not required in that only a selected portion of the lopsided or eccentric curved face rolls need be employed to shape the work.

Other modes of applying the principle of the invention may be employed, change being made as regards the details described, provided the features stated in any of the following claims or the equivalent of such be employed.

We, therefore, particularly point out and distinctly claim as our invention:

1. Apparatus for reshaping elongated round work into multi-faceted work comprising a plurality of roll stands forming work passes, each stand including a roll for each face of the work to be formed, the initial stand comprising rolls having curved work faces with the axis of symmetry of the portion of the work formed therebyy extending transversely of the transaxial center plane of the respective roll, the rolls of the initial stand having work face profiles having a plurality of radii, the centers of which are off-set from the transaxial center plane of the roll.

2. Apparatus as set forth in claim 1 wherein the rolls of the initial stand are each formed with curved face profiles having three distinct radii, the largest of which is a function of the diameter of the largest round work to be shaped and the smallest of which is a function of the diameter of the smallest round work to be shaped.

3. Apparatus as set forth in claim 2 wherein the intermediate radii of said roll is equal to the largest radii minus the smallest radii.

4. Apparatus as set forth in claim 1 wherein the rolls have a width equal to the width of a face of the largest size work to be formed, and a roll drive diameter equal to three times such width.

5. A tube reshaping machine comprising a plurality of roll stands, pass forming work engaging rolls in each stand, means mounting each roll for adjustment along its own axis and toward and away from the work to vary the pass opening configuration formed thereby, curved work faces on the rolls of at least one stand, the centers of which are laterally off-set from the roll transaxial center planes whereby symmetry of pass opening may be maintained regardless of the size of the pass opening formed thereby.

6. A pass forming roll cluster for a tube reshaping machine comprising identical rolls having lopsided curved working faces, and means adjustably mounting said rolls to nest the side of one roll in the curved work face of an adjacent roll to form a symmetrical enclosed work pass with all or part of such curved working faces.

7. A roll stand for a tube reshaping machine, means mounting on said stand a pass forming roll cluster comprising identical rolls having lopsided curved working faces, and means on said stand operative to adjust said rolls to nest the side of one roll in the curved face of an adjacent roll to form a symmetrical work pass with all or part of such curved working faces.

8. A stand as set forth in claim 7 wherein said last mentioned means includes means to adjust each roll axially of itself as well as to move each roll toward and away from the work.

9. A stand as set forth in claim 7 including means operative to rotate said cluster bodily about the axis of the work.

10. A pass forming roll cluster for a tube reshaping machine comprising identical rolls having curved working faces forming a larger working roll radius on one edge of each roll, means mounting said rolls adjustably to nest said one edge of each roll in the curved working face of the adjacent roll to form an enclosed work pass.

11. A pass forming roll cluster for a tube reshaping machine comprising identical rolls having curved working faces forming a larger working roll radius on one edge of each roll, means mounting said rolls adjustably to overlap the side of said one edge of each roll with the curved working face of the adjacent roll.

12. A pass forming roll cluster for a tube reshaping machine comprising identical rolls having curved working faces forming a larger working roll radius on one edge of each roll, means mounting said rolls adjustably to overlap the curved working face of an adjacent roll with the side of said one edge of each roll.

13. Apparatus for reshaping elongated round work into a rectilinear sectional shape workpiece comprising a plurality of roll passes, each pass including identical rolls, one for each side of the work to be formed, the initial pass including rolls having curved work faces, the center of curvature of which is laterally offset from the transaxial center plane of the respective roll.

14. Apparatus as set forth in claim 13 including means mounting each roll in said apparatus for adjustment along its own axis and toward and away from the work.

15. Apparatus as set forth in claim 13 including means mounting the rolls in each pass for bodily rotational movement about the axis of the work.

16. Apparatus as set forth in claim 13 including means mounting diametrically opposed rolls in the initial pass for movement to vary the radial angle of attack on the work of said opposed rolls from that of adjacent rolls.

17. Apparatus as set forth in claim 13 including drive means for each roll in said apparatus.

18. Apparatus as set forth in claim 13 wherein the rolls in the initial pass have a profile curvature comprised of three distinct radii, the centers of which are laterally off-set from the respective transaxial center planes of each roll.

19. Apparatus as set forth in claim 13 wherein the rolls of the initial pass each have a profile curvature comprised of three distinct radii, one radius being a factor of the diameter of the largest round work to be formed, another being a factor of the diameter of the smallest round work to be formed, and the third being the difference of the initial two.

20. Apparatus as set forth in claim 13 including drive means for each roll, said drive means being contained within said rolls.

21. A pass forming four roll cluster for a tube reshaping machine comprising identical rolls having curved work faces, the centers of which are laterally off-set from a plane passing through the centers of the rolls normal to the axes thereof.

22. A roll stand for a tube reshaping machine comprising a cluster of curved face rolls forming an enclosed work pass opening, and means operative to adjust the position of each roll to vary the size of the enclosed work pass opening formed thereby without changing the configuration of such opening.

23. A pass forming roll cluster for a tube reshaping machine comprising identical rolls having lopsided curved working faces, and means adjustably mounting said rolls to nest the side of one roll in the curved face of an adjacent roll to form an enclosed work pass opening with but a portion of such curved working faces.

24. A pass forming four roll cluster for a tube reshaping machine comprising identical rolls having curved work faces, the profile centers of which are laterally off-set from a plane passing through the centers of the rolls normal to the axes thereof.

25. A roll for a tube reshaping machine having a curved work face profile, the center of curvature of which is laterally off-set from a plane passing through the center of the roll normal to the axis thereof, the profile curved face thereof being comprised of three distinct radii, wherein one radii is a factor of the diameter of the largest tube to be shaped by the roll, another is a factor of the diameter of the smallest tube to be shaped by the roll, and a third is the difference of the former two.

26. A roll as set forth in claim 25 wherein the width of the roll is equal to approximately the width of the side of the largest shape to be formed, and said roll has a drive diameter equal to approximately three times its width.

27. A roll as set forth in claim 26 wherein the radius which is a factor of the diameter of the largest work to be formed and the radius which is the difference of the other two have an angular sweep of approximately 15°.

28. A tube forming mill comprising a plurality of stands, tube shaping rolls in said stands, and drive means for each roll, said drive means being contained within the driven roll.

29. A tube forming mill as set forth in claim 28 wherein said drive means comprises a hydraulic motor.

30. A pass forming roll cluster for a tube reshaping machine comprising a plurality of rolls forming such cluster, each roll having a concave curved work face profile, the center of curvature of each of which is laterally off-set in the same relative direction from a plane passing through the center of each roll normal to the axis thereof.

References Cited
UNITED STATES PATENTS

| | | | |
|---|---|---|---|
| 1,308,945 | 7/1919 | Gail | 72—225 |
| 1,645,434 | 10/1927 | Lindblom | 72—224 |

WILLIAM W. DYER, Jr., *Primary Examiner.*

GERALD A. DOST, *Examiner.*